W. WATTIE.
REAMER.
APPLICATION FILED MAR. 26, 1908.
952,158.
Patented Mar. 15, 1910.
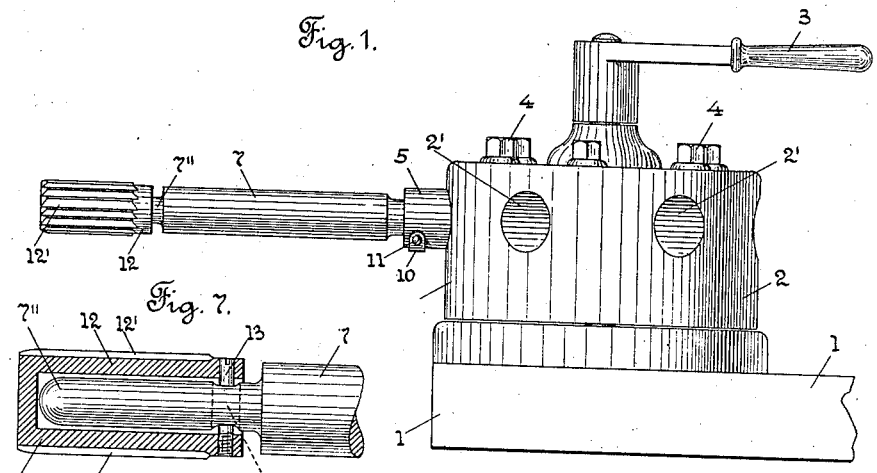
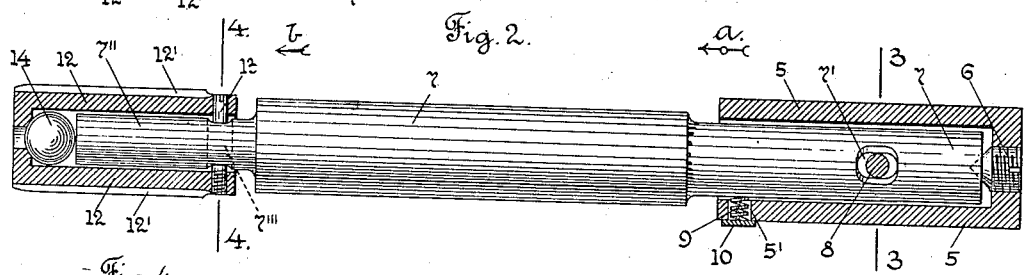
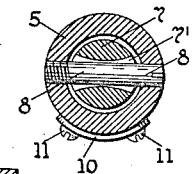
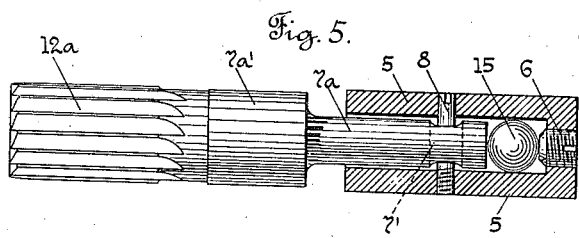
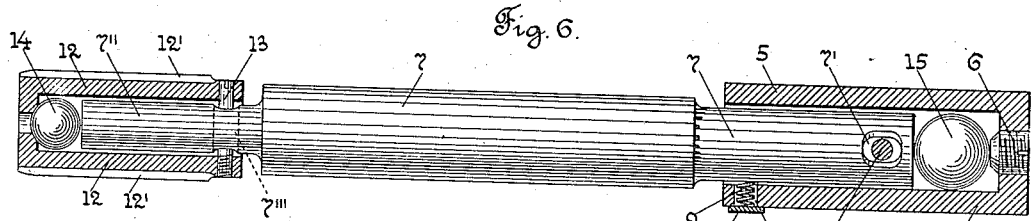
Witnesses
M. Bredr.
M. O. Haas.
Inventor
William Wattie.
By John C. Dewey
Attorney.

UNITED STATES PATENT OFFICE.

WILLIAM WATTIE, OF WORCESTER, MASSACHUSETTS, ASSIGNOR TO CROMPTON & KNOWLES LOOM WORKS, A CORPORATION OF MASSACHUSETTS.

REAMER.

952,158.     Specification of Letters Patent.     Patented Mar. 15, 1910.

Application filed March 26, 1908. Serial No. 423,384.

*To all whom it may concern:*

Be it known that I, WILLIAM WATTIE, a citizen of the United States, residing at Worcester, in the county of Worcester and State of Massachusetts, have invented certain new and useful Improvements in Reamers, of which the following is a specification.

My invention relates to reamers for reaming holes already made in metal, and particularly to reamers used in lathes, drills, etc., in which the reamer is ordinarily stationary relative to the work, and the object of my invention is to improve upon the construction of reamers of the class referred to. In the ordinary construction of reamers of the class referred to, the reamer shell, or the cutting portion is rigidly secured to the arbor or shank of the reamer, and the arbor or shank is secured in a socket, which is secured in the lathe, drill, or other machine. It is found in practice that a reamer of this construction, when used in a lathe, drill, or other power machine, will not follow exactly the hole to be reamed, as the reamer shell or cutting portion cannot adapt itself to the hole, being rigidly secured to the arbor, and further the hole is liable to be reamed with a slight trumpet shape, and not accurately cylindrical throughout its length, so that when an exact cylindrical hole is required it has been necessary to use a hand reamer, instead of a power lathe or drill reamer.

In my improvements in reamers I make the reamer shell or cutting portion hollow, and attach it to the arbor in such a manner, that the reamer shell or cutting portion will be loosely mounted on the outer end of the arbor, and the outer end of the cutting portion will be free to have a transverse or diametrical movement on the arbor. I also preferably provide a ball or roller bearing at one or both ends of the arbor. I also preferably make the hole through the arbor, for the attaching pin which secures it in the socket, flaring or trumpet shape at each end, to permit of a slight rocking movement of the arbor. I also preferably provide the hole in the arbor for the pin, which secures the reamer shell to the arbor, with a flaring or trumpet shape opening at each end.

I have only shown in the drawing a detached part of a turret lathe, and my improvements in reamers.

Referring to the drawing:—Figure 1 is a front view of the head of a turret lathe, and a reamer embodying my improvements attached thereto. Fig. 2 shows, on an enlarged scale, a central longitudinal section of the reamer shown in Fig. 1. Fig. 3 is a section, on line 3, 3, Fig. 2, looking in the direction of arrow *a*, same figure. Fig. 4 is a section, on line 4, 4, Fig. 2, looking in the direction of arrow *b*, same figure. Fig. 5 shows a modified construction of the reamer and socket shown in Fig. 2. Fig. 6 corresponds to Fig. 2, but shows a ball bearing within the socket. Fig. 7 shows a modified construction of the end of the reamer shown in Fig. 2.

In the accompanying drawing, 1 is a portion of the table of a lathe, 2 is a turret mounted thereon, and having openings 2' therein, 3 is a hand lever to tighten the turret, in the usual way.

4 are fastening screws or bolts for holding the sockets 5 in the openings 2'.

I will now describe my improvements.

The socket 5 has in its inner end a pointed screw or center 6, preferably made of hardened steel, the pointed end of which is adapted to enter a correspondingly shaped recess in the inner end of the arbor 7, see Fig. 2, to center said arbor within the socket 5, and form a bearing for the end thrust of the arbor. The arbor 7 has its inner end preferably of reduced diameter and adapted to fit loosely within the socket 5. A hole 7' extends transversely through the inner end of the arbor 7, through which a screw pin 8 extends, and is secured in a hole in the socket 5, to hold the arbor 7 within the socket. The hole 7' is made elongated, as shown in Fig. 2, to allow of a slight longitudinal movement of the arbor 7, and the outer ends of the hole 7' are preferably made slightly trumpet shaped or flaring, as shown in Fig. 3, to allow of a slight rocking or side motion of the arbor 7.

In connection with the socket 5 I may use a helically coiled expansion spring 9, which extends within an opening 5' in the socket 5, and is retained therein by a band or plate 10, attached to the socket 5 by screws 11, see Fig. 3. The inner end of the spring 9 bears against the arbor 7 and acts to raise the arbor 7 slightly at the outer end of the socket 5. The arbor 7 has its outer end 7'' preferably of reduced diameter, as shown in Fig. 2, to receive loosely the shell 12, forming the cutting portion. The shell 12 is hollow, and has the ordinary shaped cutting teeth 12' thereon and fits loosely onto the outer end of the arbor 7, and will have at its outer end a diametrical or transverse movement on the arbor to adjust itself relatively to the fixed position of the arbor. The shell is in this instance secured on the arbor 7 by a screw pin 13, which extends loosely through a hole 7''' in the arbor 7 and is secured in a hole in the inner end of the shell 12. The hole 7''' is preferably made flaring or trumpet shaped at its outer ends, as shown in Fig. 4, to allow of a slight rocking or side motion of the shell 12. Between the outer end of the arbor 7 and the outer end of the shell 12 is preferably located in this instance a metal ball 14, which forms a bearing between the end of the arbor 7 and the inner end of the shell 12, see Fig. 2; instead of a metal ball, a roll may be used as a bearing.

In Fig. 6 a metal ball 15 is in this instance shown inserted between the inner end of the arbor 7 and the center screw 6; instead of a ball, a roll may be used as a bearing.

In Fig. 5 is shown a shank reamer with the enlarged portion 7<sup>a'</sup> of the shank 7<sup>a</sup> and the cutting portion 12<sup>a</sup> made integral, and combined with a socket similar to that shown in Fig. 6.

In Fig. 7 the outer end of the arbor 7 is made rounded, to form a bearing for the inner portion of the outer end of shell 12, and the metal ball 14, shown in Figs. 2 and 6, is not used.

It will be understood that the details of construction of my improvements may be varied if desired, and my improvements in reamers may be used in lathes, drills, or other machines.

Having thus described my invention, what I claim as new and desire to secure by Letters Patent is:—

1. A reamer having the shell or cutting portion loosely mounted on the arbor, and secured to the arbor to have a movement thereon, and said arbor having an opening therethrough for a pin which attaches said arbor to its holding socket.

2. In a reamer, the combination with an arbor and a cutting portion made separate therefrom, and loosely mounted on the end thereof, and secured thereto, of a ball or roll between the outer end of the arbor and the outer end of said cutting portion.

3. The combination with a reamer, comprising an arbor, and a cutting portion loosely mounted on said arbor, and secured thereto, of a socket for said arbor, and a pin extending through an opening in said arbor, to attach the arbor to said socket.

4. A reamer, comprising an arbor, and a shell or cutting portion loosely mounted thereon, and having a flexible connection therewith, and a ball or roller interposed between the end of said arbor and the end of said shell.

WILLIAM WATTIE.

Witnesses:
 JOHN C. DEWEY,
 M. HAAS.